Patented Oct. 19, 1937

2,096,637

UNITED STATES PATENT OFFICE 2,096,637

PROCESS FOR THE MANUFACTURE OF UNSATURATED ALIPHATIC ALDEHYDES

Henri Martin Emmanuel Guinot, Melle, France

No Drawing. Application May 21, 1935, Serial No. 22,653. In Belgium July 14, 1926

7 Claims. (Cl. 260—138)

The invention herein described relates to the manufacture of unsaturated aliphatic aldehydes from saturated aldehydes, the present application being a continuation-in-part of my copending application, Serial No. 204,429, filed July 8, 1927.

In the manufacture of unsaturated aliphatic aldehydes from saturated aldehydes such as crotonaldehyde from acetaldehyde, the prior art shows the use of alkali earths, cyanides, sulphites, and carbides in the presence of an organic solvent such as ether, or if an alkali is used, the latter, in partly dilute form, serves as a condensing agent.

I have found that the presence of organic solvents increases the cost of manufacture and complicates the clear separation of the ultimate product, while the use of the dilute alkali except where the alkali is diluted with sufficient water to dissolve the saturated aliphatic aldehyde which has not been done or suggested heretofore will not result in a pure unsaturated aliphatic aldehyde, also the control of the reaction is quite delicate. On the other hand, with my process as set forth hereinafter it will be shown that:—

(a) Reaction is even;

(b) Formation of side reactions—polymerization—is nil;

(c) Only sufficient alkali is required to complete the condensation;

(d) Cost of the solvent medium, which in the present case is water, is negligible;

(e) Separation of the intermediate product—aldol—is completely omitted;

(f) Inorganic salts, obtained after the neutralization of the alkali with an inorganic acid, remain in solution;

(g) Distillation of crotonaldehyde is effected in the presence of a large excess of water;

(h) There is a substantial increase of yield over all previous processes by obtaining at least a 90% conversion of the theoretical yield of saturated aliphatic aldehyde into an unsaturated aldehyde.

In order to insure a high conversion and the complete elimination of polymerization products, water is used as the solvent and is present in the proportion of not less than 60% by weight of the saturated aldehyde. This water dissolves the saturated aldehyde and remains as a solvent of the condensation product. Above 60% there is no limit, merely a personal choice. While I consider 60% by weight the minimum limit, I prefer to use in practice 90–120 percent of water based upon the weight of the saturated aldehyde, which in the present instance may be acetaldehyde. For instance, for every 1,000 pounds of acetaldehyde, I may use 900–1,100 pounds of water. Acetaldehyde being very soluble in water, yields a complete solution. This solution is now preferably cooled sufficiently low so that upon the addition of the alkali, the condensation agent, very little rise in temperature occurs. The condensation agent is added dissolved. Its concentration has absolutely no bearing upon the yield, because the saturated aldehyde is completely dissolved in the 60% by weight of water above mentioned. In the present instance, the concentration of the alkali does not cause a rise of temperature, but the chemical reaction taking place is an exothermic reaction. However, owing to the presence of the large amount of the inorganic solvent—water—the exothermic reaction is quite mild. Consequently an even reaction, easily controllable mixture and a pure condensation product are obtained. It is noteworthy that the intermediate product, the aldol, which is in solution, the result of the condensation of the saturated aldehyde that had been dissolved by the large quantity of water above set forth being the production of the aldol as an aqueous solution and upon distillation of this solution whereby the aldol is always dissolved in a large quantity of water, yields pure crotonaldehyde, which can be separated in the usual manner. This product is free from resins and other contaminations.

Assuming we dissolve 1,000 pounds of acetaldehyde in 1,000 pounds of water, making a ratio of 100 percent (water) solvent to acetaldehyde:—this mixture is cooled, say first to +5° C. and sufficient alkali, such as caustic soda, potash, or alkali carbonate such as sodium carbonate, or alkali earth such as lime, or baryta, approximately 10 lbs. is added. In order to get a uniform product, the condensation agent is introduced slowly under vigorous agitation. This is followed by a temperature rise. However, the presence of the large volume of the inorganic solvent—water—makes the rise very gradual. While the reaction is exothermic, the condensation is not very rapid and requires several hours to result in an equilibrium between the aldol and saturated aldehyde. I have found that this equilibrium results in ⅓ of unconverted acetaldehyde and ⅔ converted into aldol. In order to obtain the unsaturated aldehyde, the slight excess of alkali used as a condensation agent is neutralized with phosphoric acid. The prior art refers to hydrochloric, or sulphuric acid. I have found that these two acids act too violently and that weaker acids such as phosphoric acid are preferable. In the present instance, we require 100 lbs. of phosphoric acid whereby the final mixture is slightly acid. This acid is also preferable, being less corrosive, consequently the life of the equipment is prolonged and the unit cost per pound of product is reduced.

The neutralized condensation product is now directly distilled. We obtain, first, the ⅓ of unconverted acetaldehyde, which may be re-used, and then the remainder distills over as a binary mixture crotonaldehyde-water at 84–85 degrees C.

It is noteworthy that most of the inorganic solvent (the water) remains in the still, and all inorganic salts remain in solution; and, since no polymerization products or resins are formed, the yield of unsaturated aliphatic aldehydes is increased, a higher distillation efficiency is obtained, and the final product is free of contamination.

With the use of the large amount of inorganic solvent indicated above, 1000 pounds of acetaldehyde yields at least 470 pounds of pure crotonaldehyde and 330 pounds of recovered acetaldehyde.

While in the above I have used as an example acetaldehyde, I do not wish to be understood as confining myself to this one product. For instance, butyraldehyde, if processed under these conditions, will yield a pure α-ethyl-β-propyl acroleine, or similar saturated aliphatic aldehydes.

I claim:—

1. A process for the production of an unsaturated aliphatic aldehyde from a saturated aliphatic aldehyde, while dissolved in water which comprises dissolving a saturated aliphatic aldehyde in from 90 to 120 percent of its weight of water, subjecting it to aldol condensation, acidifying the product and distilling it whereby an unsaturated aldehyde is obtained.

2. A process for the production of an unsaturated aliphatic aldehyde from a saturated aliphatic aldehyde, which comprises dissolving a saturated aliphatic aldehyde in from 90 to 120 percent of its weight of water, adding sufficint alkali to render the solution alkaline and to cause aldol condensation of the aldehyde, when such condensation has progressed to equilibrium acidifying the solution with an inorganic acid, and distilling it, whereby a pure, unsaturated aldehyde is obtained substantially all of it as an azeotropic mixture with water.

3. A process which yields at least 90 percent of the theoretical yield of unsaturated aldehyde from a saturated aliphatic aldehyde, which comprises dissolving a saturated aliphatic aldehyde in from 90 to 120 percent of its weight of water, condensing said aldehyde to an aldol, acidifying the product and distilling it at atmospheric pressure whereby a pure unsaturated aliphatic aldehyde is formed and substantially all of it obtained as an azeotropic mixture with water.

4. In a process for manufacturing an unsaturated aliphatic aldehyde, the steps of dissolving a saturated aliphatic aldehyde in from 90 to 120 percent of its weight of water, cooling the solution below 15° centigrade and maintaining it at that temperature while condensing it to aldol by means of caustic alkali.

5. The process of obtaining an unsaturated aliphatic aldehyde which comprises dissolving a saturated aliphatic aldehyde in from 90 to 120 percent of its weight of water, mixing condensing agent selected from the group consisting of caustic soda, potash, alkali metal carbonate, and alkaline earth metal oxides and hydroxides in such quantity as to render the solution alkaline and to condense the aldehyde to an aldol, maintaining the solution at rest until the said condensation has reached equilibrium between the aldehyde and the aldol, acidifying and distilling the solution, collecting from the distillate, separately, first the unchanged aliphatic aldehyde, then substantially all of the unsaturated aldehyde as an azeotropic mixture with water.

6. The process of manufacturing pure crotonaldehyde which comprises dissolving pure acetaldehyde in from 90 to 120 percent of its weight of water, cooling said mixture to a temperature below 15° centigrade, slowly adding thereto, with vigorous stirring, and while maintaining said temperature, a solution of an alkaline condensing agent in such quantity as to render the solution alkaline and to cause condensation of the aldehyde to aldol, acidifying the mixture with phosphoric acid, and removing therefrom by distillation, first, the unchanged aldehyde, then, separately, an azeotropic mixture of water and substantially all of the crotonaldehyde.

7. The process of producing an azeotropic mixture of water and crotonaldehyde, which comprises the aldol condensation of acetaldehyde dissolved in from 90 to 120 percent of its weight of water, the acidification of the product by an inorganic acid, distillation off from the mixture unchanged aldehyde, then an azeotropic mixture of water and crotonaldehyde.

HENRI MARTIN EMMANUEL GUINOT.